United States Patent
Saito

(10) Patent No.: US 9,345,056 B2
(45) Date of Patent: May 17, 2016

(54) FREQUENCY SELECTION FOR DEVICE TO DEVICE WIRELESS COMMUNICATION

(71) Applicant: FUJITSU LIMITED, Kawasaki-shi, Kanagawa (JP)

(72) Inventor: Naritoshi Saito, Hino (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/496,939

(22) Filed: Sep. 25, 2014

(65) Prior Publication Data

US 2015/0119022 A1 Apr. 30, 2015

(30) Foreign Application Priority Data

Oct. 24, 2013 (JP) .................. 2013-221653

(51) Int. Cl.
| | | |
|---|---|---|
| *H04W 48/08* | (2009.01) | |
| *H04W 84/18* | (2009.01) | |
| *H04W 76/02* | (2009.01) | |
| *H04W 64/00* | (2009.01) | |
| *H04W 8/00* | (2009.01) | |
| H04W 72/04 | (2009.01) | |
| H04W 88/10 | (2009.01) | |
| H04W 72/02 | (2009.01) | |
| H04W 92/18 | (2009.01) | |

(52) U.S. Cl.
CPC ............ *H04W 76/023* (2013.01); *H04W 8/005* (2013.01); *H04W 64/00* (2013.01); *H04W 72/02* (2013.01); *H04W 72/042* (2013.01); *H04W 72/0453* (2013.01); *H04W 88/10* (2013.01); *H04W 92/18* (2013.01)

(58) Field of Classification Search
CPC ....... H04W 4/00; H04W 48/08; H04W 84/18; H04W 84/20
USPC .......................................... 455/41.2
See application file for complete search history.

(56) References Cited

U.S. PATENT DOCUMENTS

| | | | | |
|---|---|---|---|---|
| 8,812,013 | B2 * | 8/2014 | Agarwal | G01S 5/0263 455/127.4 |
| 2003/0219002 | A1 * | 11/2003 | Kishida | H04W 16/16 370/338 |

(Continued)

FOREIGN PATENT DOCUMENTS

| | | |
|---|---|---|
| JP | 2008-17318 | 1/2008 |
| JP | 2008-245242 | 10/2008 |

*Primary Examiner* — Christopher M Brandt
(74) *Attorney, Agent, or Firm* — Fujitsu Patent Center

(57) ABSTRACT

A wireless communication apparatus includes an acquisition unit, a calculation unit, a selection unit, and a notification unit. The acquisition unit acquires location information of a first terminal and a second terminal that perform terminal-to-terminal communication without using a base station. The calculation unit calculates a distance between the first and second terminals based on the acquired location information of the first and second terminals. The selection unit selects a frequency to be used for the terminal-to-terminal communication based on the distance calculated by the calculation unit. The notification unit notifies the first and second terminals of a start of the terminal-to-terminal communication and the selected frequency.

5 Claims, 12 Drawing Sheets

(56) References Cited

U.S. PATENT DOCUMENTS

| | | | |
|---|---|---|---|
| 2005/0190784 A1* | 9/2005 | Stine | H04L 45/40 370/445 |
| 2007/0155408 A1* | 7/2007 | Belcea | G01S 5/0205 455/458 |
| 2008/0009280 A1 | 1/2008 | Ushiki et al. | |
| 2009/0291644 A1* | 11/2009 | Suwa | H04B 1/005 455/77 |
| 2010/0240306 A1* | 9/2010 | Jendbro | G01S 19/05 455/41.2 |
| 2012/0008526 A1* | 1/2012 | Borghei | H04W 4/08 370/254 |
| 2012/0009875 A1* | 1/2012 | Miettinen | A61B 5/0006 455/41.2 |
| 2012/0122396 A1* | 5/2012 | Ha | H04W 52/288 455/41.1 |
| 2014/0094122 A1* | 4/2014 | Etemad | H04W 76/02 455/41.2 |

* cited by examiner

| DISTANCE BETWEEN TERMINALS | r≤r1 | r1<r≤r2 | r2<r≤r3 |
|---|---|---|---|
| TERMINAL VELOCITY | v≤v1 | | |
| FREQUENCY TO BE USED | 3.5 GHz BAND | 2.5 GHz BAND | 800 MHz BAND |

| LONGITUDE | LATITUDE | FREQUENCY INFORMATION | CELL ID INFORMATION | USE STATUS |
|---|---|---|---|---|
| ... | ... | ... | ... | |
| Xc1 TO Xc2 | Yc1 TO Yc2 | 840 M | 0012 | SMALL INTERFERENCE |
| | | 2530 M | 0031 | NO INTERFERENCE |
| | | 3550 M | 0062 | NO INTERFERENCE |
| Xc2 TO Xc3 | Yc2 TO Yc3 | 840 M | 0012 | NO INTERFERENCE |
| | | 2530 M | 0031 | LARGE INTERFERENCE |
| | | 3660 M | 0067 | SMALL INTERFERENCE |
| ... | ... | ... | ... | |

FIG.14

| UL-DL CONFIGURATION | DL-to-UL SWITCH POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

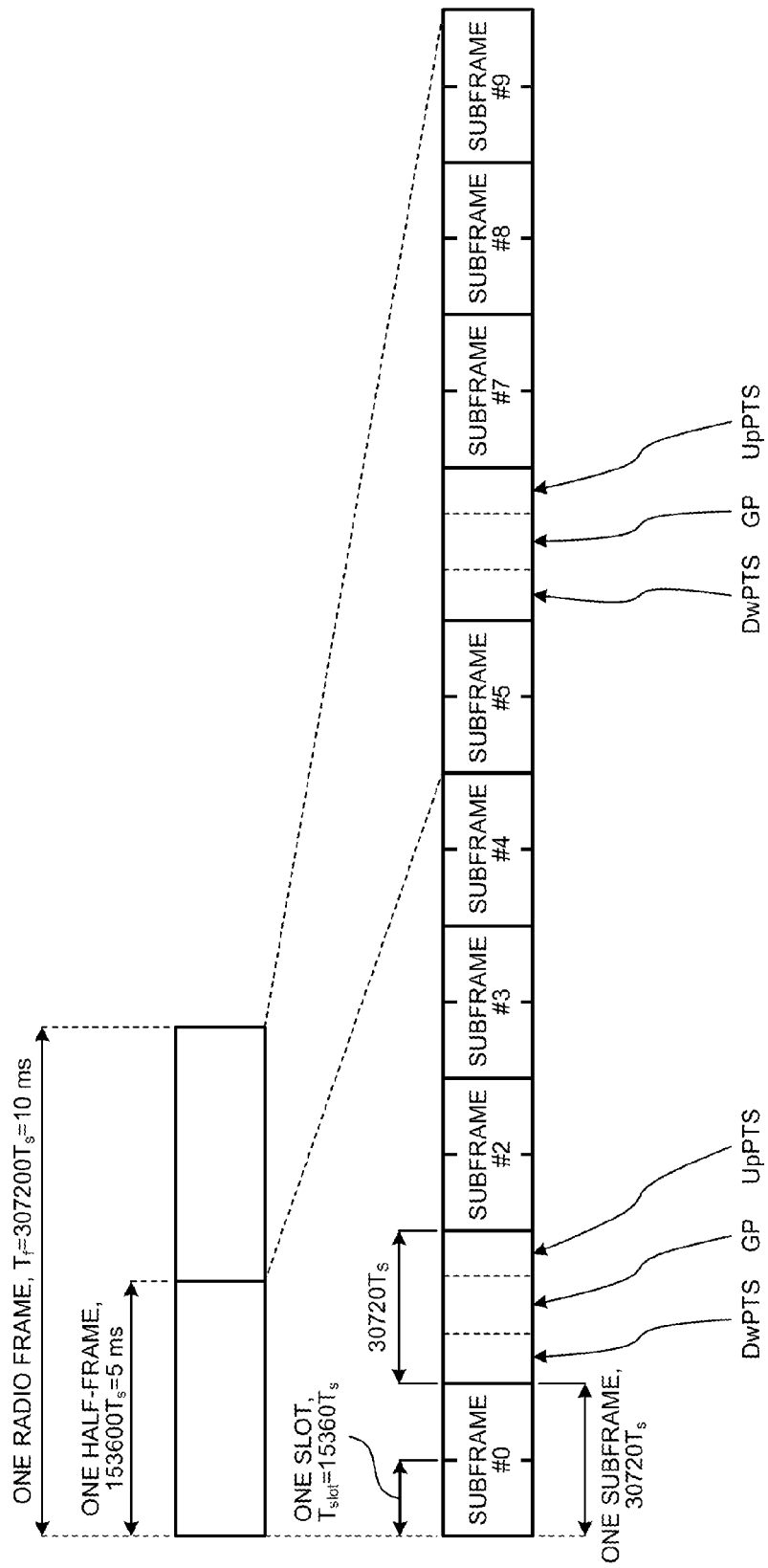

FREQUENCY SELECTION FOR DEVICE TO DEVICE WIRELESS COMMUNICATION

CROSS-REFERENCE TO RELATED APPLICATION(S)

This application is based upon and claims the benefit of priority of the prior Japanese Patent Application No. 2013-221653, filed on Oct. 24, 2013, the entire contents of which are incorporated herein by reference.

FIELD

The embodiments discussed herein are related to a wireless communication apparatus, a wireless communication method, and a wireless communication system.

BACKGROUND

In recent years, various wireless communication technologies, such as Bluetooth, Wireless Local Area Network (WLAN), and Femtocell technologies, are widely used. Wireless communication by these technologies is free from the trouble of connecting communication terminals with a cable. These technologies are also convenient for users since it is easy to set wireless connection.

However, each of these wireless communication technologies has a problem to be solved. For example, in the Bluetooth, access points are not used for communication between terminals, but a valid communication distance between terminals is short. Accordingly, its application is limited to, for example, transmission of audio data from audio instruments to earphones. The WLAN is a technology that provides terminal-to-terminal communication via a relay device called an access point. Since a wireless communication network is formed by using access points, it is difficult for users to make a wireless connection outside the wireless communication network. The Femtocell is an ultra-small base station system which becomes popular in recent years. Since wireless communication is performed via a base station, the femtocell communication is limited to the service area of each base station. Under these circumstances, Device-to-Device (D2D) communication is attracting attention as a new wireless communication technology.

The D2D communication is a wireless communication technology in which portable devices, such as cellular phones, directly communicate with each other without using a base station. The D2D communication has an advantage of being able to secure a long valid communication distance as compared with other wireless communication technologies which provide communication without using the base station. If the D2D communication is used, data communication can be performed at a maximum rate by making full advantage of the capacity of each terminal. Since users directly communicate without using the base station in the D2D communication, communication delay between terminals is advantageously smaller. The D2D communication further has an advantage that communication congestion in each base station can be eased as the number of users increases.

The D2D communication is expected to be used for various applications. For example, the D2D communication is expected to provide users, who are in the service range of the D2D communication, with service of the Social Networking System (SNS), and/or is expected to be used for advertisement distribution. The D2D communication is further expected to be used as a communication method at the time of disasters in which the base stations are not available.

With regard to the conventional wireless communication technologies, see Japanese Laid-Open Patent Publication No. 2008-017318 and Japanese Laid-Open Patent Publication No. 2008-245242, for example.

However, the D2D communication has a problem in that an optimal frequency is not selected therefor.

Since the frequency for use in the D2D communication is not appropriately set in the conventional technologies, some of the throughputs in the D2D communication are lower than an expected throughput. Communication interruption may also occur during some of the D2D communication sessions.

SUMMARY

According to an aspect of an embodiment, a wireless communication apparatus includes an acquisition unit, a calculation unit, a selection unit, and a notification unit. The acquisition unit acquires location information of a first terminal and a second terminal that perform terminal-to-terminal communication without using a base station. The calculation unit calculates a distance between the first and second terminals based on the acquired location information of the first and second terminals. The selection unit selects a frequency to be used for the terminal-to-terminal communication based on the distance calculated by the calculation unit. The notification unit notifies the first and second terminals of a start of the terminal-to-terminal communication and the selected frequency.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 illustrates one example of a radio frame configuration; and

FIG. 15 illustrates one example of a subframe configuration in D2D communication.

DESCRIPTION OF EMBODIMENTS

Preferred embodiments of the present invention will be explained with reference to accompanying drawings. The embodiments are not intended to limit the present embodiment. The respective embodiments may properly be combined without causing inconsistency.

[a] First Embodiment

Description of Apparatuses in System

Figure 1:
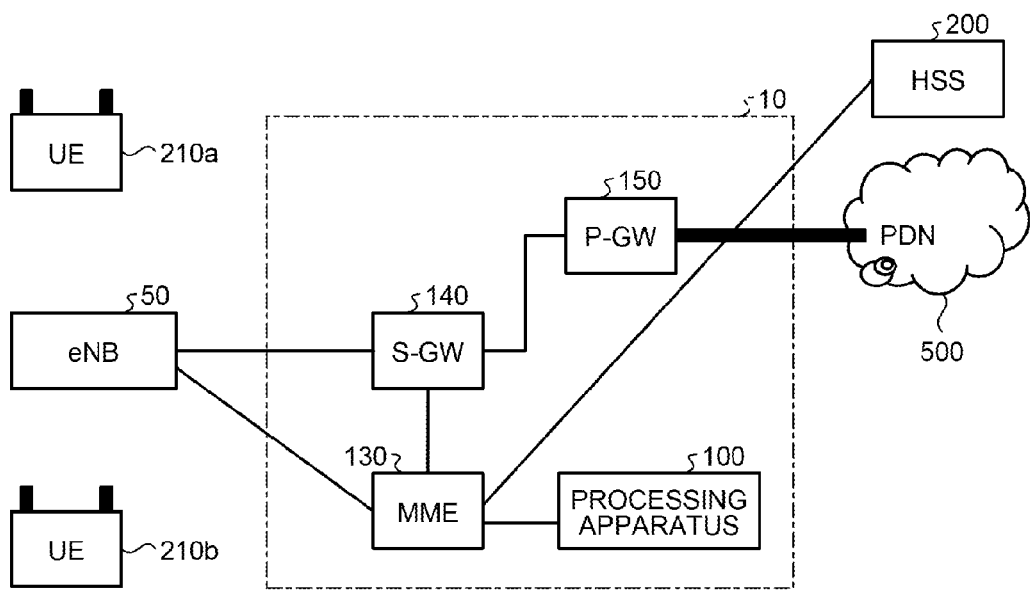
FIG. 1 illustrates one example of a configuration of a wireless communications system according to a first embodiment.

A description will now be given of the flow of processing to be performed prior to the start of D2D communication in a wireless communication system according to the first embodiment. FIG. 1 illustrates one example of the configuration of the wireless communication system according to the first embodiment. As illustrated in FIG. 1, a Long-Term Evolution (LTE) Advanced network 10 includes a processing apparatus 100, a Mobility Management Entity (MME) 130, a Serving Gateway (S-GW) 140, and a Packet Data Network-Gateway (P-GW) 150. The MME 130 and the S-GW 140 are connected to an eNB 50 which is an LTE base station. The MME 130 is connected to the processing apparatus 100 and a Home Subscriber Server (HSS) 200. The P-GW 150 is connected to a Packet Data Network (PDN) 500 which is a public data network. User Equipment (UE) 210a and 210b can wirelessly communicate with the eNB 50. The UE 210a and the UE 210b are mobile terminals, such as cellular phones, notebook PCs, tablet PCs, and PDAs.

Figure 2:
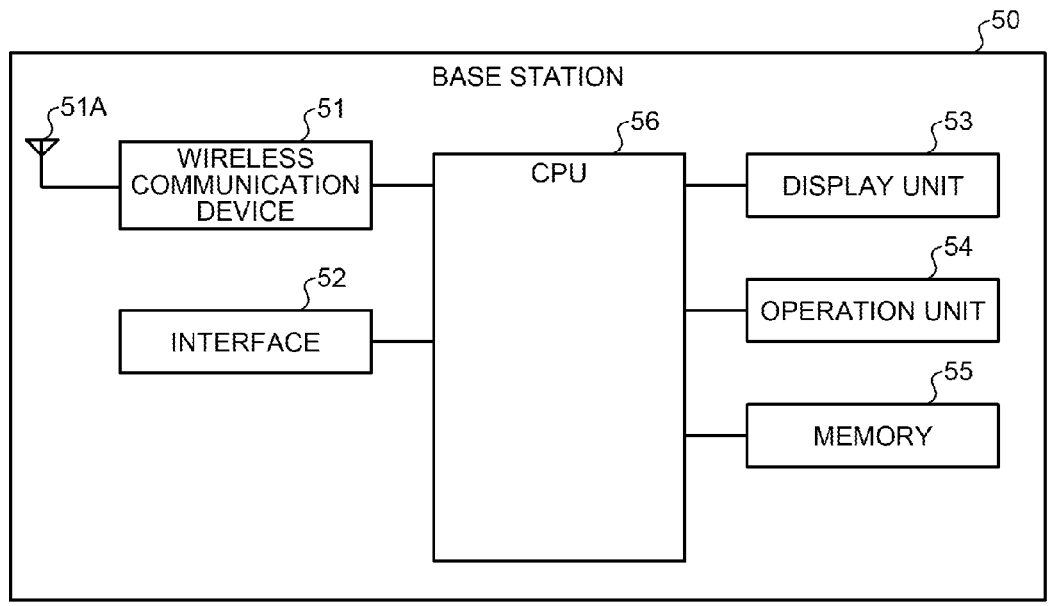
FIG. 2 illustrates a configuration of an enhanced Node B (eNB) that is a base station according to the first embodiment.

FIG. 2 illustrates the configuration of the base station eNB according to the present embodiment. The eNB 50 has a central processing unit (CPU) 56 that performs processing to communicate with wireless terminals. The CPU 56 is connected to an interface 52, a display unit 53, an operation unit 54, and a memory 55. The CPU 56 is further connected to an antenna 51A via a wireless communication device 51. The antenna 51A wirelessly communicates with respective wireless terminals.

A description will be given of the outline of the processing performed in the wireless communication system when the UE 210a starts D2D communication with the UE 210b. The wireless communication system starts the D2D communication after going through an LTE cell synchronization stage, an SAE bearer starting stage, a stage of specifying a frequency to be used in D2D communication, and a stage of controlling session control of Session Initiation Protocol (SIP). Hereinafter, the outline of the processing in each of these four preparatory stages provided for starting the D2D communication will be described.

First, the LTE cell synchronization stage will be described. For LTE cell synchronization, a Universal Mobile Telecommunication System (UMTS) technology is used. In the UMTS, 10 ms is allocated to one frame, and each 10 ms-frame is divided into 15 slots. Each UMTS slot includes a Primary Synchronization Channel (PSC), a Secondary Synchronization Channel (SSC), and a Primary Common Control Physical Channel (P-CCPCH). The respective terminals perform synchronization processing of the PSC and the SSC, demodulates the P-CCPCH, and acquires a Broadcasting Control Channel (BCCH) signal. The respective terminals then acquire a Public Land Mobile Network (PLMN) code from a Master Information Block (MIB) in the BCCH signal.

Now, the stage of starting the SAE bearer will be described with reference to FIG. 1. First, the UE 210a makes a connection to the eNB 50 which is a nearby base station based on a Radio Resource Control (RRC) protocol. The UE 210a then transmits a D2D setting request signal to the MME 130. The MME 130 accesses the HSS 200 that stores information such as information on contracts with users, and performs user authentication. The MME 130 then transmits a location registration request signal to the HSS 200, and stores the connection of the UE 210a with the MME 130. Next, the HSS 200 transmits a location registration response signal to the MME 130.

The MME 130 then transmits an SAE bearer setting request signal to the S-GW 140. The S-GW 140 then transmits a route setting request signal to the P-GW 150. At this time, the P-GW 150 allocates an IP address to the UE 210a. The P-GW 150 then transmits a route setting response signal to the S-GW 140. The S-GW 140 then transmits an SAE bearer setting response signal to the MME 130. The MME 130 then transmits an attachment completion notification signal to the UE 210a via the eNB 50. Thus, the wireless communication system sets the SAE bearer from the UE 210a to the P-GW 150. The MME 130 further accesses the HSS 200 to allocate an IP address to the UE 210b, and sets an SAE bearer from the UE 210b to the P-GW 150 as in the case of the UE 210a.

Figure 3:
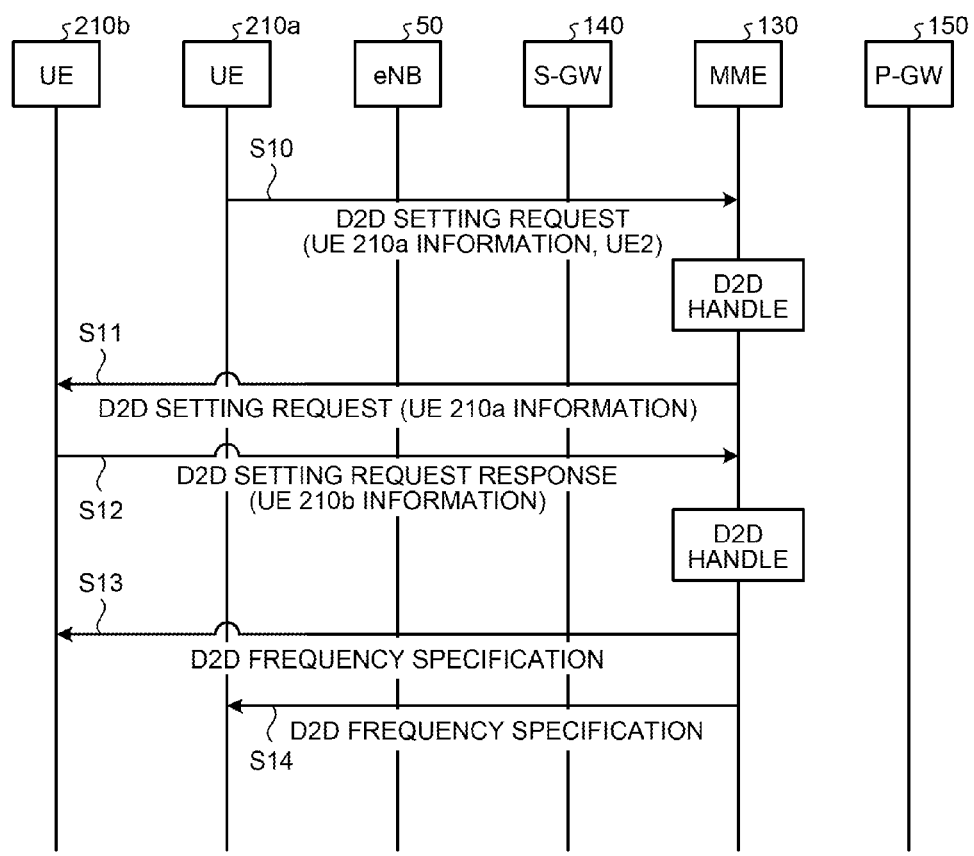
FIG. 3 illustrates one example of a control flow for specifying a frequency to be used for D2D communication.

Next, the stage of specifying the frequency to be used in D2D communication will be described with reference to FIG. 3. FIG. 3 illustrates one example of a control flow for specifying the frequency to be used for D2D communication. In FIG. 3, the processing apparatus 100 and the MME 130 are collectively illustrated as the MME 130.

First, the UE 210a transmits a D2D setting request signal including location information of the UE 210a to the MME 130 (step S10). In this case, the processing apparatus 100 receives the location information of the UE 210a from the MME 130, and stores the location information in a storage area. Next, the MME 130 transmits a D2D setting request signal which includes the information on the UE 210a to the UE 210b with a D2D handle (step S11). Next, the UE 210b transmits a D2D setting request response signal including the location information of the UE 210b (step S12). In this case, the processing apparatus 100 receives the location information of the UE 210b from the MME 130, and stores the location information in the storage area.

Next, the processing apparatus 100 acquires the location information of the UE 210a and the UE 210b from the storage area. The processing apparatus 100 then calculates a distance between the terminals, the UE 210a and the UE 210b, based on the acquired location information of the UE 210a and the UE 210b. Next, the processing apparatus 100 selects a frequency to be used in D2D communication based on the distance between the terminals. The details of selecting the frequency to be used in D2D communication will be described later. The MME 130 then transmits a signal to specify frequency to be used in D2D to the UE 210a and the UE 210b to notify the selected frequency (steps S13 and S14).

Figure 4:
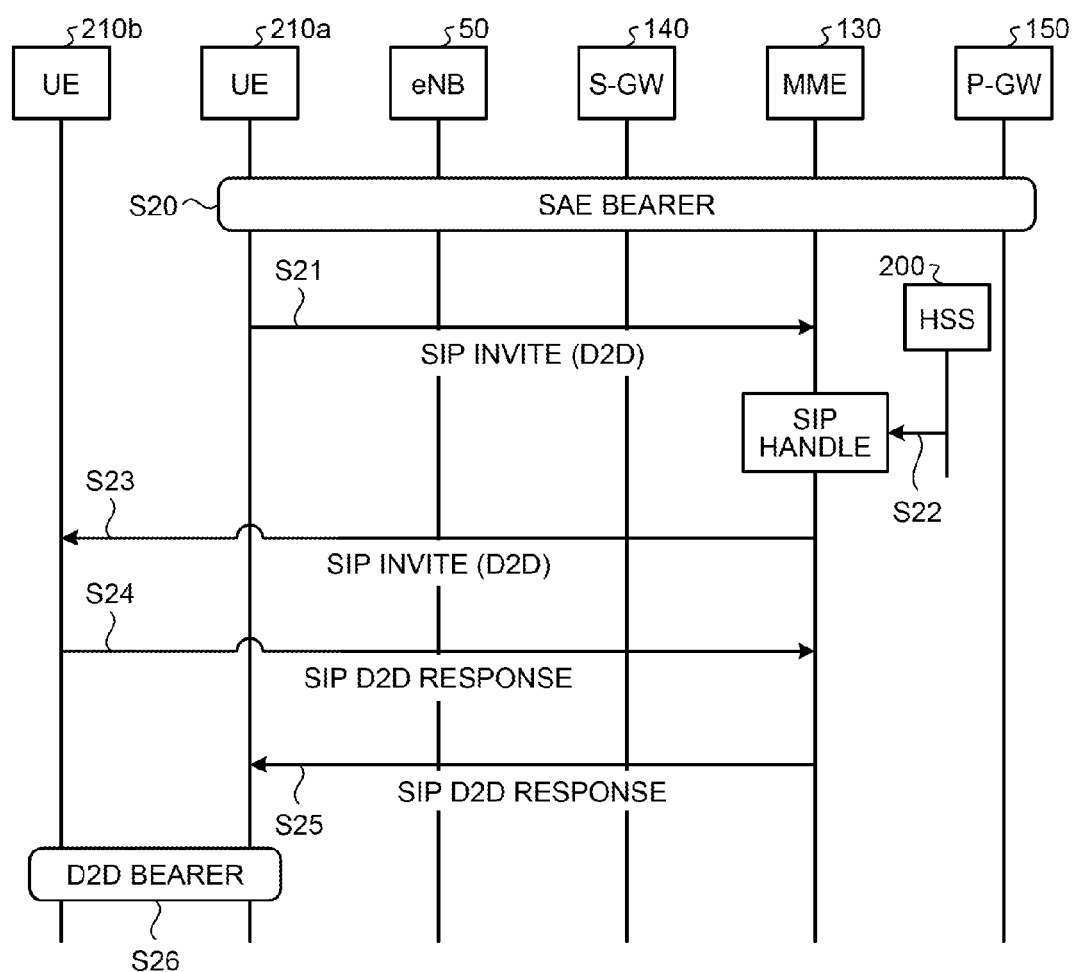
FIG. 4 illustrates one example of a control flow from the start of a System Architecture Evolution (SAE) bearer to the start of a D2D bearer.

Next, the stage of SIP session control will be described with reference to FIG. 4. FIG. 4 illustrates one example of the control flow from the start of an SAE bearer to the start of a D2D bearer. As illustrated in FIG. 4, to start the D2D bearer, SIP session control is performed in the SAE bearer (step S20) which is set according to the above-stated procedure. First, the UE 210a transmits to the MME 130 an SIP invite message which includes information indicating the start of D2D communication with the UE 210b that is a communication destination (step S21). Next, the MME 130 inquires registered information of the UE 210b from the HSS 200, and acquires the registered information of the UE 210b (step S22). The MME 130 then transmits an SIP invite message to the UE 210b with an SIP handle (step S23). Next, the UE 210b transmits to the MME 130 an SIP D2D response including a response that approves establishment of a D2D session (step S24). The MME 130 then transmits the SIP D2D response to the UE 210a (step S25). Thus, the wireless communication system sets the D2D bearer between the UE 210a and the UE 210b (step S26).

Functional Configuration of Processing Apparatus

Figures 5, 6:
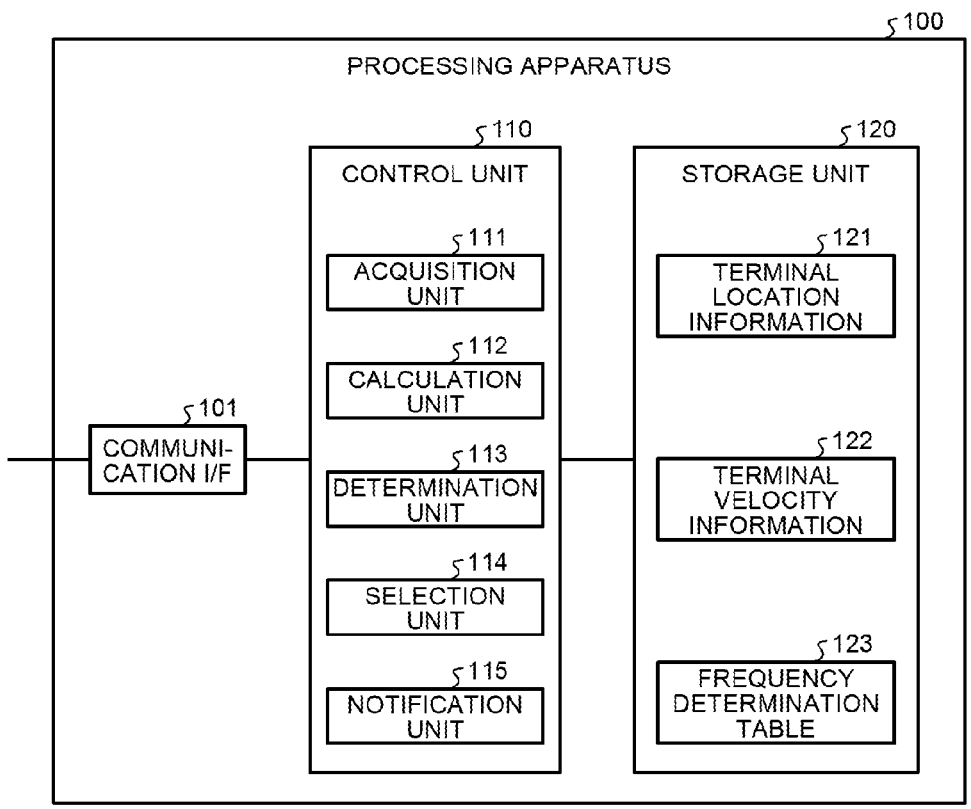
FIG. 5 is a functional block diagram illustrating a configuration of a processing apparatus according to the first embodiment.
FIG. 6 illustrates one example of a data structure of a frequency determination table.

A description will be given of one example of the functional configuration of the processing apparatus 100 according to the first embodiment. FIG. 5 is a functional block diagram illustrating the configuration of the processing apparatus 100 according to the first embodiment. As illustrated in FIG. 5, the processing apparatus 100 includes a communication I/F 101, a control unit 110, and a storage unit 120. The processing apparatus 100 is connected to the MME 130 of FIG. 1 via the communication I/F 101.

Component Members of Storage Unit

The storage unit 120 stores terminal location information 121, terminal velocity information 122, and a frequency determination table 123. The storage unit 120 corresponds to, for example, semiconductor memory devices such as random access memories (RAMs), read only memories (ROMs), and flash memories, and storage devices such as hard disks and optical discs.

The terminal location information 121 is data including location information indicating latitude and longitude relating to the current location of each terminal. The terminal location information 121 is current location information identified by a Global Positioning System (GPS) function included in each terminal. The terminal location information 121 includes information acquired at specified time intervals and relating to information acquisition time. For example, the terminal location information 121 includes the location information indicating latitude and longitude relating to the current locations of the UE 210a the UE 210b, and minute and second relating to the acquired time.

The terminal velocity information 122 is data including a current movement velocity of each terminal. The terminal velocity information 122 may be calculated based on terminal location information acquired at different times from the terminal location information 121. The details of calculating the terminal velocity information 122 will be described later.

FIG. 6 illustrates one example of a data structure of the frequency determination table 123. As illustrated in FIG. 6, the frequency determination table 123 sets the distance between terminals in association with the terminal velocity and the frequency to be used. "Distance between terminals" represents a distance r between the terminals which perform D2D communication. "Terminal velocity" represents a movement velocity v of one terminal that moves faster, out of the respective terminals which perform D2D communication. "Frequency to be used" represents a frequency that is actually used in D2D communication. For example, assume that r1, r2, and r3, which are parameters relating to the distance between terminals, are respectively set to 300 m, 600 m and 1000 m in the frequency determination table 123. In this case, if the distance between terminals is 200 m, the frequency determination table 123 indicates that a communication frequency of 3.5 GHz band is to be used. The frequency determination table 123 also indicates that a communication frequency of 2.5 GHz band is to be used if the distance between terminals is 400 m. The frequency determination table 123 also indicates that a communication frequency of 800 MHz band is to be used if the distance between terminals is 700 m.

Moreover, the frequency determination table 123 indicates that D2D communication may be started by using the selected frequency when v1, which is a parameter relating to the terminal velocity, is set to 40 km/h and the terminal velocity is 20 km/h. In contrast, when the terminal velocity is 50 km/h, the frequency determination table 123 indicates that D2D communication is not started.

Component Members of Control Unit

As illustrated in FIG. 5, the control unit 110 has an acquisition unit 111, a calculation unit 112, a determination unit 113, a selection unit 114, and a notification unit 115. The function of the control unit 110 may be implemented by, for example, an integrated circuit, such as an Application Specific Integrated Circuit (ASIC) and a Field Programmable Gate Array (FPGA). The function of the control unit 110 may be implemented by, for example, a specific program executed by a CPU.

The respective component members of the control unit 110 will be described along a processing flow. First, the acquisition unit 111 acquires current location information from the respective terminals in the form of (ax.bx.cx, ay.by.cy) where a represents "latitude or longitude," b represents "minute" corresponding to acquisition time, and c represents "second" corresponding to the acquisition time. Next, the acquisition unit 111 stores the acquired location information in the terminal location information 121 in the storage unit 120.

Then, the calculation unit 112 calculates a distance between the respective terminals. More specifically, the calculation unit 112 acquires the location information of the respective terminals at the same time from the terminal location information 121. When the location information of the UE 210a is expressed by (xc, yc), and the location information of the UE 210b is expressed by (xl, yl), the calculation unit 112 substitutes these location information in the following expression (1) to calculate r1:

$$r1 = \sqrt{[(xc-xl) \times \cos(\pi//180 \times yl/3600)]^2 + (yc-yl)^2} \quad (1)$$

The calculation unit 112 then substitutes calculated r1 in 11=30.9×r1 to calculate a distance between terminals 11. The calculation unit 112 then sends the calculated distance between terminals to the determination unit 113 and the selection unit 114.

Next, the calculation unit 112 calculates velocity information of the terminals based on the terminal location information 121 in the storage unit 120. More specifically, the calculation unit 112 acquires from the terminal location information 121 the location information of the terminals at current time, and the location information of the terminals after the lapse of 5 seconds. Next, when the current location information of the terminals is expressed by (x1, y1), and the location information of the terminals after the lapse of 5 seconds is expressed by (x2, y2), the calculation unit 112 substitutes these location information in the following expression (2) to calculate R1:

$$R1 = \sqrt{[(x_2-x_1) \times \cos(\pi/180 \times y_1/3600)]^2 + (y_2-y_1)^2} \quad (2)$$

The calculation unit 112 then substitutes calculated R1 in L1=30.9×R1 to calculate a movement distance L1 after the lapse of 5 seconds. The calculation unit 112 then stores a movement velocity calculated as the terminal velocity information 122 in the storage unit 120. The calculation unit 112 may convert the movement velocity into movement velocity per second and movement velocity per minute.

Next, when the distance between terminals calculated by the calculation unit 112 is equal to or less than a prescribed distance, the determination unit 113 determines to start D2D communication. When the distance between terminals is larger than the prescribed distance, the determination unit 113 determines not to start D2D communication.

Next, the determination unit 113 determines whether or not the movement velocities of the terminals stored in the terminal velocity information 122 are equal to or less than the terminal velocity v1 in the frequency determination table 123. When the movement velocities of the terminals are larger than the terminal velocity v1, the determination unit 113 determines not to start D2D communication. On the contrary, the determination unit 113 determines to start D2D communication when the movement velocities of the terminals are equal to or less than the terminal velocity v1. The D2D communication is started only when the movement velocities of the terminals are equal to or less than the prescribed velocity. This is because communication becomes unstable when the terminal movement velocities are larger than the velocity at which D2D communication can be performed.

Next, the selection unit 114 refers to the frequency determination table 123 and selects a frequency to be used. For example, when r1, r2, and r3, which are parameters relating to the distance between terminals, are respectively set to 300 m, 600 m, and 1000 m in the frequency determination table 123 of FIG. 6, and the distance between terminal is 250 m, the selection unit 114 selects a communication frequency of 3.5 GHz band. The selection unit 114 selects a communication frequency of 2.5 GHz band when the distance between terminals is 450 m. The selection unit 114 selects a communication frequency of 800 MHz band when the distance between terminals is 750 m. The determination unit 113 transmits the selected frequency to the notification unit 115. The distance r3 represents a distance at which D2D communication can be performed. If the distance between terminals is larger than r3, the determination unit 113 determines not to start D2D communication.

Next, the notification unit 115 transmits a D2D use frequency specification signal to the respective terminals via the MME 130. The respective terminals which perform D2D communication start D2D communication by using the communication frequency corresponding to the selected frequency information.

More specifically, the processing apparatus 100 notifies the respective terminals of the frequency determined as described below. First, the acquisition unit 111 acquires the current location information of the respective terminals and stores it in the terminal location information 121 in the storage unit 120. Next, the calculation unit 112 calculates the distance between terminals and the terminal movement velocities based on the location information of the terminals which perform D2D communication. Next, the determination unit 113 determines whether or not to start D2D communication based on the distance between terminals and the movement velocities calculated by the calculation unit 112. Next, the selection unit 114 selects a frequency to be used based on the distance between terminals which perform D2D communication. Then, the notification unit 115 receives the frequency selected by the selection unit 114, and notifies the respective terminals of the frequency information via the communication I/F 101.

Thus, when the distance between terminals at the time of performing D2D communication is large, the selection unit 114 selects a communication frequency of a relatively low frequency bandwidth. When the distance between terminals is small, the selection unit 114 selects a communication frequency of a relatively high frequency bandwidth. As a result, a radio wave easily travels to a distance while avoiding obstacles since a low communication frequency is used when the distance between terminals is large. When the distance between terminals is small, a high communication frequency is used to prevent traffic from being concentrated in the low frequency band.

Flow for Setting D2D Communication

Figure 7:
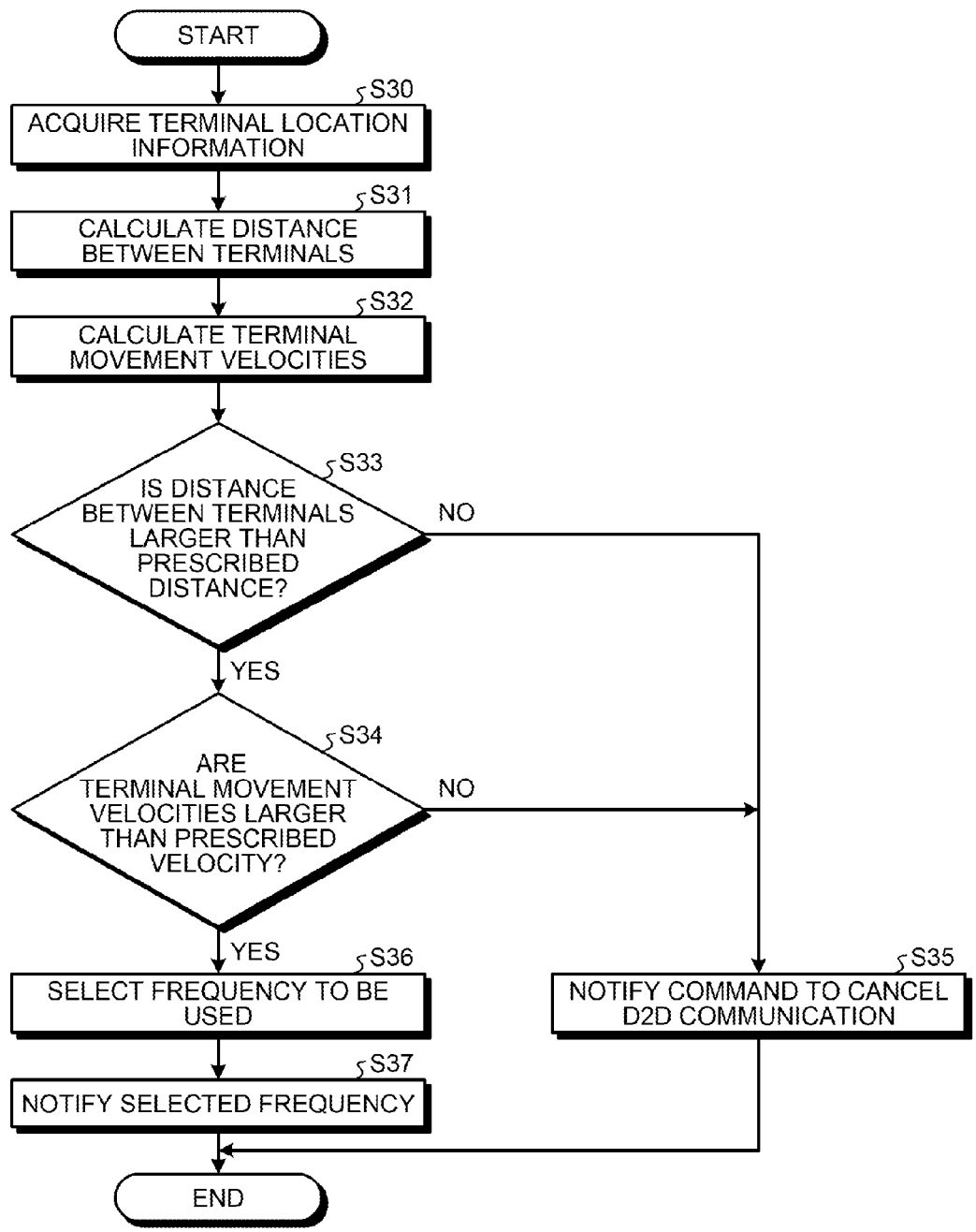
FIG. 7 illustrates one example of a flow for setting D2D communication according to the first embodiment.

FIG. 7 illustrates one example of the flow for setting the D2D communication according to the first embodiment. As illustrated in FIG. 7, the acquisition unit 111 first acquires from the storage unit 120 terminal location information of the respective terminals which perform D2D communication (step S30). Next, the calculation unit 112 calculates a distance between the terminals based on the location information of the respective terminals (step S31). The calculation unit 112 then calculates movement velocities of the terminals based on the location information of the respective terminals acquired at different times (step S32).

Next, the determination unit 113 determines whether or not the distance between terminals is within a prescribed distance (step S33). When the distance between terminals is larger than the prescribed distance (step S33: No), the determination unit 113 notifies the respective terminals of a command to cancel D2D communication (step S35), and ends the processing. On the contrary, when the distance between terminals is within the specified value (step S33: Yes), the determination unit 113 performs processing of next step S34. When the terminal movement velocities of the respective terminals which perform D2D communication are larger than the prescribed velocity in the processing of step S34 (step S34: No), the determination unit 113 notifies the respective terminals of the command to cancel D2D communication (step S35), and ends the processing. On the contrary, when the terminal movement velocities are within the prescribed velocity (step S34: Yes), the determination unit 113 performs processing of next step S36.

Next, the selection unit 114 refers to the frequency determination table 123 and selects a frequency to be used based on the distance between terminals (step S36). Then, the notification unit 115 notifies the respective terminals of the selected frequency (step S37), and ends the processing.

[b] Second Embodiment

When a radio wave of D2D communication interferes with a radio wave of another communication scheme which uses the same frequency as in the D2D communication, distortion occurs in their communication signals. As a result, even in a distance range where D2D communication is applicable, a noise may be generated in the communication signals and reliability of communication may deteriorate.

When packet communication is performed by using a base station, interference reduction measures, such as adjusting the direction of antennas in the base station, are generally taken. However, in the case of D2D communication, respective users start communication at arbitrary locations, which makes it difficult to avoid access to communication paths used by other users. Therefore, at the time of performing D2D communication, it is preferable to avoid the frequencies used by other communications. Accordingly, in the second embodiment, the frequency is set in consideration of interference with other communications. Hereinafter, respective component members of the second embodiment will be described.

Figure 8:
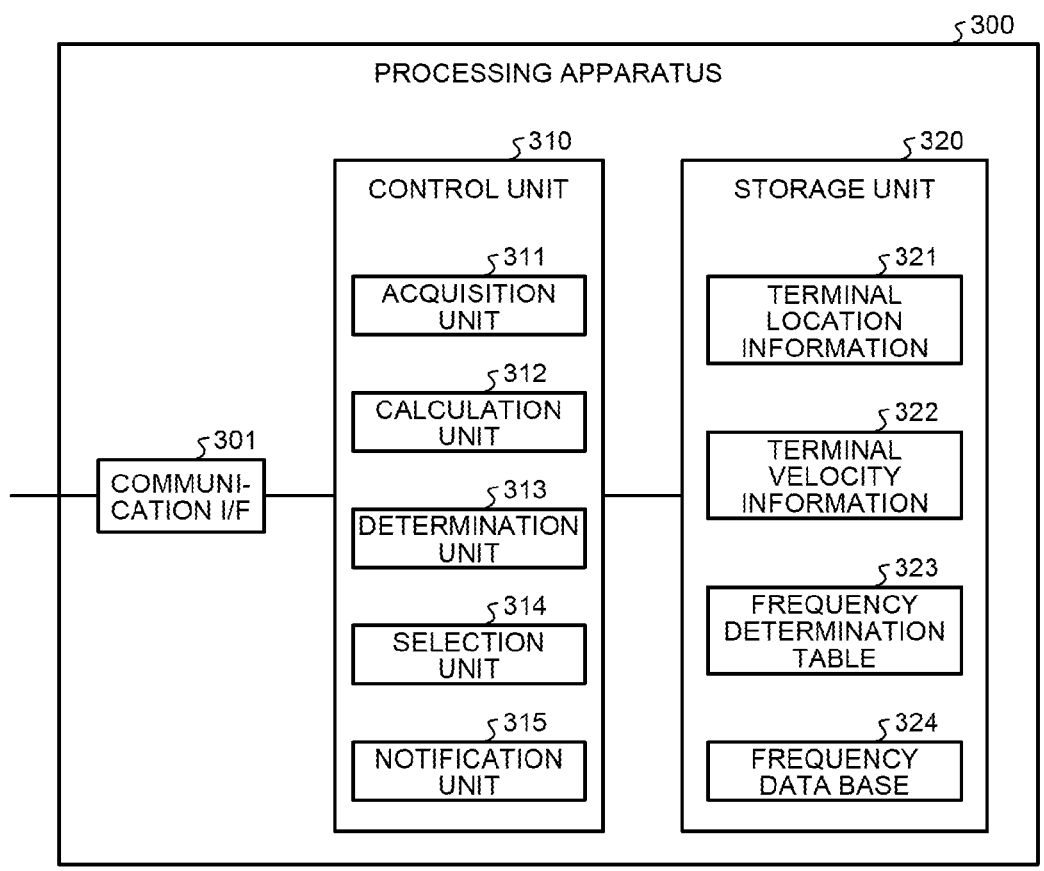
FIG. 8 is a functional block diagram illustrating a configuration of a processing apparatus according to a second embodiment.

FIG. 8 is a functional block diagram illustrating the configuration of a processing apparatus according to the second embodiment. A processing apparatus 300 has the same configuration as the processing apparatus 100 in the first embodiment except that a frequency data base 324 is provided. In particular, the processing apparatus 300 includes a communication interface 301, a control unit 310, and a storage unit 320. The control unit 310 includes an acquisition unit 311, a calculation unit 312, a determination unit 313, a selection unit 314, and a notification unit 315. The storage unit 320 includes terminal location information 321, terminal velocity information 322, a frequency determination table 323, and the frequency data base 324. A description of the component members identical to those of the processing apparatus 100 in the first embodiment is omitted. The component members identical to those of the processing apparatus 100 in the first embodiment are designated by reference numerals identical in the last two digits.

Component Members of Storage Unit

Figures 9, 10:
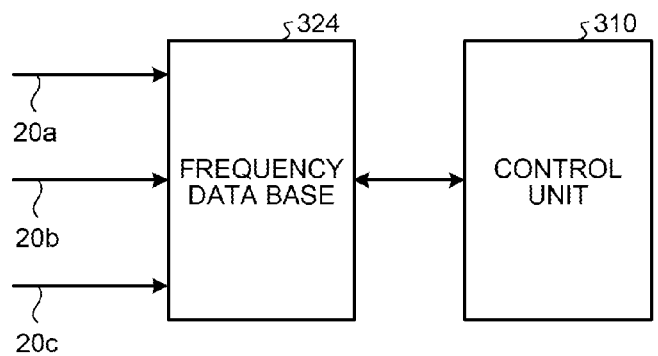
FIG. 9 illustrates one example of a data structure of a frequency determination table.
FIG. 10 is an explanatory view illustrating collection of information relating to a use status of communication frequencies in each target area.

FIG. 9 illustrates one example of a data structure of the frequency data base 324. As illustrated in FIG. 9, latitude, longitude, frequency information, cell ID information, and use status are associated with each other in the frequency data base 324. "Longitude" and "latitude" represent ranges of latitude and longitude of a communication target area. The frequency information and the use status represent the use status of each communication frequency in a certain target area. The cell ID information represents an identification number of each base station whose use status is acquired. For example, the first line of the frequency data base 324 indicates that interference is small when a center frequency of 840 MHz is selected for a target area having a longitude of "Xc1 to Xc2" and a latitude of "Yc1 to Yc2." The second line of the frequency data base 324 indicates that no interference is present when a center frequency of 2530 MHz is selected for the target area having a longitude of "Xc1 to Xc2" and a latitude of "Yc1 to Yc2." The third line of the frequency data base 324 indicates that no interference is present when a center frequency of 3550 MHz is selected for the target area having a longitude of "Xc1 to Xc2" and a latitude of "Yc1 to Yc2." The frequency data base 324 also indicates the use status of each frequency in other target areas. The center frequency may be divided more finely, and the use status of the respective divided center frequencies may be presented in the frequency data base 324.

FIG. 10 is an explanatory view illustrating collection of information relating to the use status of communication frequencies in each target area. As illustrated in FIG. 10, the frequency data base 324 acquires the use status of each frequency from the respective base stations which belong to a target area. For example, the frequency data base 324 acquires, from a base station with a cell ID of "0012," information 20a relating to the use status in the case of the center frequency of 840 MHz in a target area having a longitude of "Xc1 to Xc2" and a latitude of "Yc1 to Yc2." The frequency data base 324 also acquires, from a base station with a cell ID of "0031," information 20b relating to the use status in the case of the center frequency of 2530 MHz in the same target area as in the case of the information 20a. The frequency data base 324 also acquires information 20c relating to the use status in the case of the center frequency of 3550 MHz in the same target area as in the case of the information 20a and 20b. The frequency data base 324 similarly acquires the use status of each communication frequency in other target areas.

Component Members of Control Unit

The selection unit 314 refers to the frequency data base 324 and selects a frequency with small interference based on the use status of the frequencies in the target area of each user. For this process, the selection unit 314 first refers to the frequency determination table 323 and selects a frequency band corresponding to the distance between terminals as in the first embodiment. The selection unit 314 then selects in the frequency determination table 323 a frequency with small interference among the frequency bands corresponding to the distance between terminals, or selects a frequency with small interference among the frequency bands which are lower than the frequency band corresponding to the distance between terminals.

For example, when respective users start D2D communication in a target area having a longitude of "Xc2 to Xc3" and a latitude of "Yc2 to Yc3," the selection unit 314 refers to the frequency determination table 323 with the same configuration as the frequency determination table 123 of FIG. 6 and selects 2.5 GHz band based on the distance between the terminals. Next, the selection unit 314 refers to the frequency data base 324 of FIG. 9 to confirm that interference is large in the center frequency of 2530 MHz in the target area with the longitude of "Xc2 to Xc3" and the latitude of "Yc2 to Yc3." The selection unit 314 then confirms that there is no interference in the center frequency of 840 MHz in the same target area. The selection unit 314 then selects a frequency in the vicinity of the center frequency of 840 MHz having no interference. Then, the selection unit 314 transmits the selected frequency to the notification unit 315.

More specifically, the selection unit 314 refers to the frequency determination table 323 and selects a frequency band corresponding to the distance between terminals. Next, the selection unit 314 selects a frequency with small interference based on the frequency data base 324. Consequently, at the time of performing D2D communication, interference with other D2D communications can be avoided. This makes it possible to prevent generation of noise and to achieve communication with high reliability.

[c] Third Embodiment

In such cases where the distance between terminals of the users who perform D2D communication is large and/or an obstacle is present, a transmission error occurs relatively easily. Accordingly, a receiving user-side terminal may perform error control, such as hybrid Automatic Repeat-Request (ARQ), to detect and correct a bit error. In that case, if a random error frequently occurs and/or a burst error occurs, the number of retransmission requests is increased, which tends to cause propagation delay, resulting in unstable communication.

There may be a case where users hope to secure the stability of communication in such occasions as sending an urgent message to a communication destination party. Accordingly, in the third embodiment, users can set Quality of Service (QoS) at the time of starting D2D communication. Hereinafter, respective component members of the third embodiment will be described.

Figure 11:
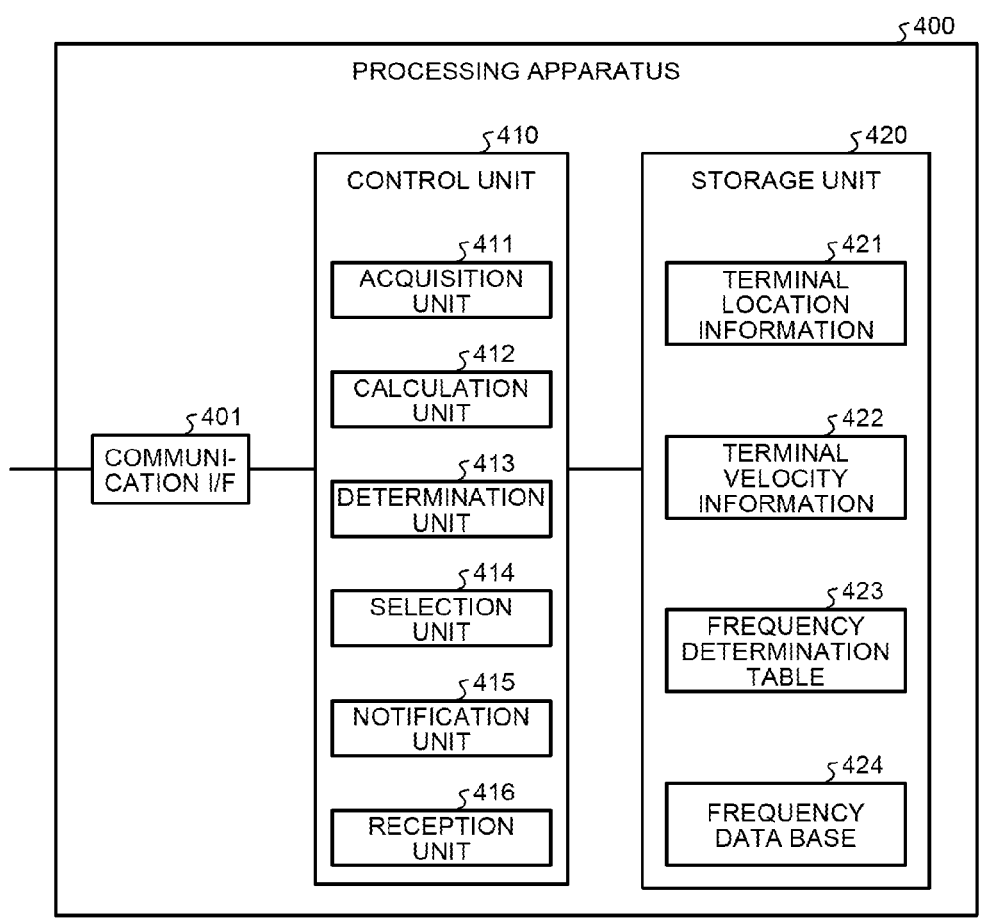
FIG. 11 is a functional block diagram illustrating a configuration of a processing apparatus according to a third embodiment.

FIG. 11 is a functional block diagram illustrating the configuration of a processing apparatus according to the third embodiment. A processing apparatus 400 includes a communication interface 401, a control unit 410, and a storage unit 420. The control unit 410 includes an acquisition unit 411, a calculation unit 412, a determination unit 413, a selection unit 414, a notification unit 415, and a reception unit 416. The storage unit 420 includes terminal location information 421, terminal velocity information 422, a frequency determination table 423, and a frequency data base 424. The processing apparatus 400 has the same configuration as the processing apparatus 300 in the second embodiment except that the control unit 410 has the reception unit 416. A description of the component members identical to those of the processing apparatus 300 in the second embodiment is omitted. The component members identical to those of the processing apparatus 300 in the second embodiment are designated by reference numerals identical in the last two digits.

Component Members of Control Unit

In the third embodiment, the control unit 410 further includes the reception unit 416 that receives QoS for use in performing D2D communication from the respective terminals. First, when the reception unit 416 receives a request of high QoS from a user, the reception unit 41 notifies the selection unit 414 of the received QoS. Then, the selection unit 414 refers to the frequency data base 424 and selects a frequency of a low frequency band which is used by a smaller number of users and therefore has less interference. Thus, by setting QoS at the time of performing D2D communication of high importance, stable communication can be secured.

Figure 12:
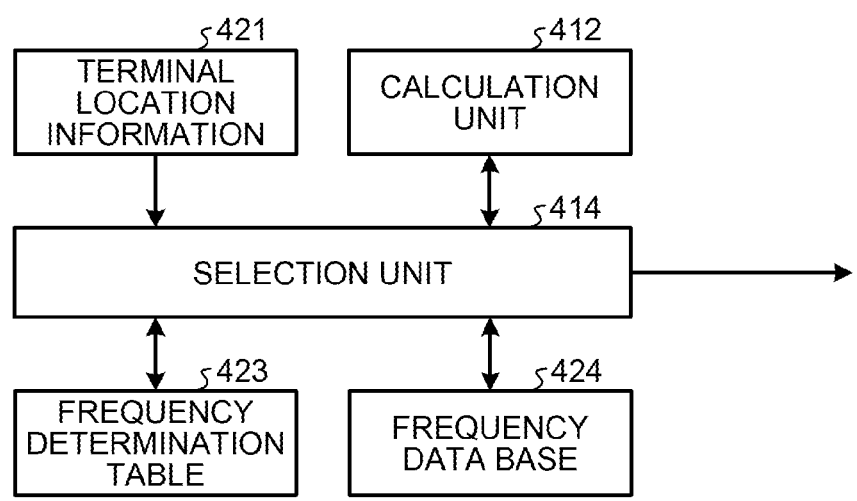
FIG. 12 is an explanatory view illustrating processing to determine a frequency to be used in communication.

The outline of the processing to determine a frequency to be used in communication will be described. FIG. 12 is an explanatory view illustrating processing to determine a frequency to be used in communication. As illustrated in FIG. 12, the calculation unit 412 first calculates a distance between terminals based on the terminal location information 421. Then, the selection unit 414 refers to the frequency determination table 423 and selects a frequency band based on the calculated distance between terminals. The selection unit 414 then refers to the frequency data base 424 and selects a frequency of small interference in the selected frequency band or in a frequency band lower than the selected frequency band. When a QoS request is made by the user, the selection unit 414 allocates a frequency in the lower frequency band in preference to other communications. This makes it possible to achieve the effect of being able to improve the communication speed and communication stability in terminal-to-terminal communication.

Hardware Configuration of Wireless Terminal

Figure 13:
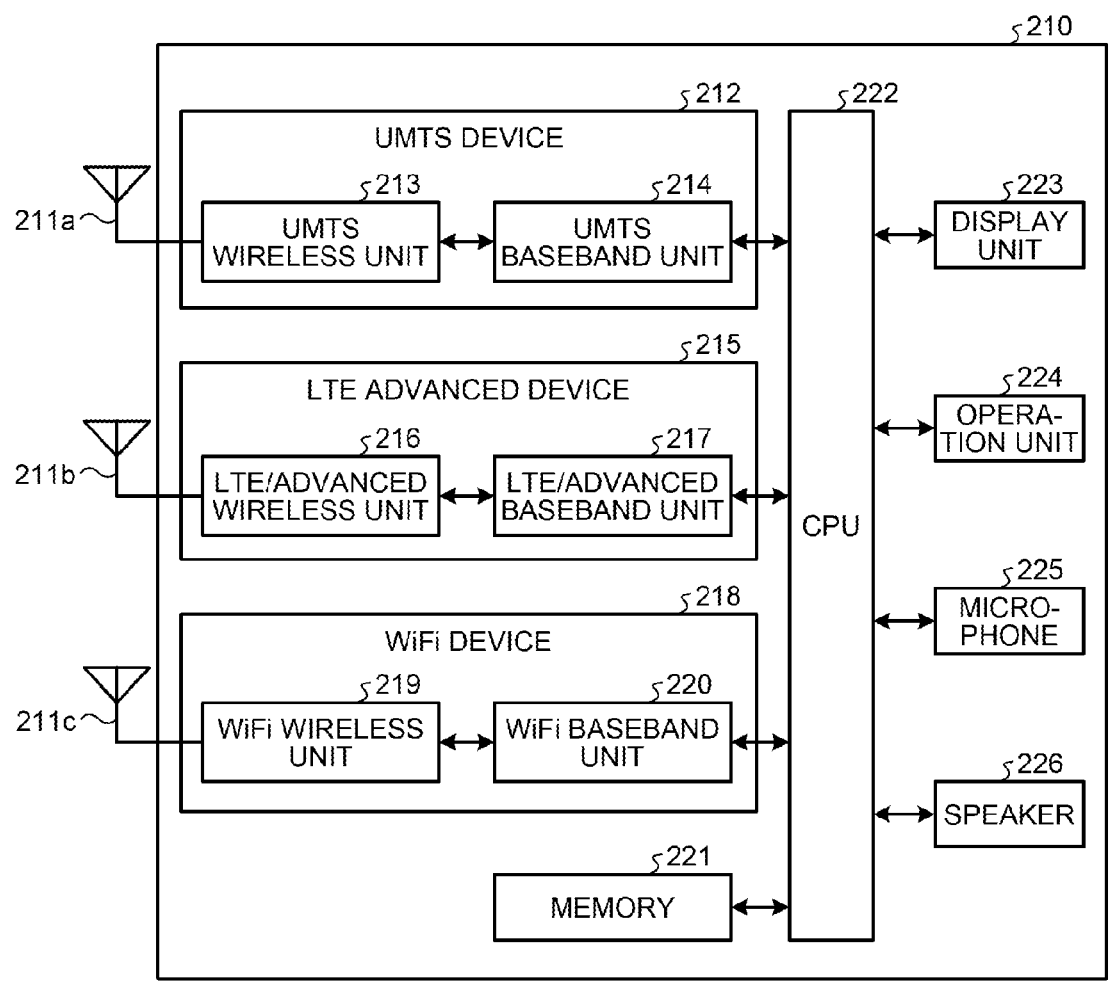
FIG. 13 illustrates one example of a hardware configuration of a wireless terminal.

FIG. 13 illustrates one example of a hardware configuration of a wireless terminal. As illustrated in FIG. 13, a UE 210 has a UMTS device 212, an LTE Advanced device 215, a WiFi device 218, a memory 221, a CPU 222, a display unit 223, an operation unit 224, a microphone 225, and a speaker 226.

The UMTS device 212 includes a UMTS wireless unit 213 and a UMTS baseband unit 214. An antenna 211a is connected to the UMTS wireless unit 213 to transmit and receive a radio wave. The LTE Advanced device 215 includes an LTE/Advanced wireless unit 216 and an LTE/Advanced baseband unit 217. An antenna 211b is connected to the LTE/Advanced wireless unit 216 to transmit and receive a radio wave. The WiFi device 218 includes a WiFi wireless unit 219 and a WiFi baseband unit 220. An antenna 211c is connected to the WiFi wireless unit 219 to transmit and receive a radio wave.

When the wireless terminal 210 performs D2D communication, the LTE Advanced device 215 is used. For example, the LTE/Advanced baseband unit 217 receives a digital signal, such as a sound input from the microphone 225, from the CPU 222 and converts the digital signal into a baseband signal through D/A conversion. Then, the LTE/Advanced wireless unit 216 converts the baseband signal received from the LTE/Advanced baseband unit 217 into an RF signal corresponding to the frequency selected by the selection unit 414. Then, the antenna 211b transmits the RF signal to a counterpart wireless terminal with which D2D communication is performed.

Configuration of Radio Frame and Subframe of D2D Communication

A physical layer of LTE communication including D2D communication is made up of frames in time units of 10 ms. The D2D communication employs a Time Division Duplex (TDD) system in which both the terminals that perform communication use the same frequency. In the TDD system, different times are allocated to an uplink communication and a downlink communication to perform time multiplexing communication.

FIG. 14 illustrates one example of a radio frame configuration. As illustrated in FIG. 14, UL-DL configuration, DL-to-UL switch point periodicity, and subframe number are associated with each other. "UL-DL configuration" expresses types of subframe allocation for uplink communication and downlink communication. As illustrated in FIG. 14, a total of seven types of configurations, from 0 to 6, are provided. "DL-to-UL switch point periodicity" expresses the periodicity of a subframe relating to a switch point. "Subframe number" expresses the number of each subframe. An alphabet written in the field of each subframe represents the type of the subframe. An alphabet "U" represents a subframe allocated to the uplink communication. An alphabet "D" represents a subframe allocated to the downlink communication. An alphabet "S" represents a subframe allocated to the switch point. One radio frame has a total of ten subframes.

For example, in the configuration 0, six subframes are allocated to the uplink communication, two subframes are allocated to the downlink communication, and two subframes are allocated to the switch point. In the configuration 1, four subframes are allocated to the uplink communication, four subframes are allocated to the downlink communication, and two subframes are allocated to the switch point. In other configurations, subframes are also allocated to the uplink communication, the downlink communication, and the switch point, respectively.

By selecting the configuration for use in D2D communication, the processing apparatus 100 of FIG. 1 can increase the speed of the uplink communication and increase the speed of the downlink communication. In D2D communication, the configuration 1 is mainly used.

FIG. 15 illustrates one example of a subframe configuration in D2D communication. As illustrated in the upper row of FIG. 15, one radio frame can be divided into two half frames. One subframe in each half frame is allocated to the switch point. As illustrated in FIG. 14, the switch point "S" is allocated to positions where the subframe "U" of the uplink communication and the subframe "D" of the downlink communication are switched.

As illustrated in the lower row of FIG. 15, the subframe relating to the switch point is present between "Subframe #0" and "Subframe #2" and between "Subframe #5" and "Subframe #7." This subframe is made up of a Downlink Pilot Time Slot (DwPTS), a Guard Period (GP), and an Uplink Pilot Time Slot (UpPTS). The DwPTS is an extended time period for the downlink communication. The processing apparatus 100 can extend the time period of the downlink communication by increasing the DwPTS. The UpPTS is an extended time period for the uplink communication. The processing apparatus 100 can extend the time period of the uplink communication by increasing the UpPTS. The GP is a time period provided in order to avoid interference between the uplink communication and the downlink communication. In D2D communication, the DwPTS and the UpPTS are variable, so that the times allocated to uplink and downlink communications can be changed. This makes it possible to solve a number of problems which arise in the TDD system.

Although some of the embodiments of the present disclosure have been described in detail with reference to accompanying drawing, they are only illustrative. As described in the summary of the invention, the present invention may be implemented in other forms attained by applying various arrangements and modifications based on the knowledge of those skilled in the art.

The terms "section," "module," and "unit" used in the claim may be interpreted as "means", "circuit", and other terms. For example, the acquisition unit may be interpreted as an acquisition means or an acquisition circuit.

Furthermore, among the respective processings described in the embodiments of the present invention, all or part of the processings which have been described to be performed automatically (for example, calculation of distance between terminals) may be performed manually. Or alternatively, all or part of the processings which have been described to be performed manually may be performed automatically by a publicly known method. In addition, the processing procedures, control procedures, specific names, and information including various kinds of data and parameters which have been disclosed in the above description and the drawings may arbitrarily be changed unless otherwise specified.

According to an embodiment of the present invention, the communication speed and communication stability can be improved in terminal-to-terminal communication.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus, comprising a memory and a processor coupled to the memory, the processor being configured to execute a process including:
    acquiring location information of a first terminal and a second terminal that perform terminal-to-terminal communication without using a base station;
    calculating a distance between the first and second terminals based on the acquired location information of the first and second terminals;
    acquiring movement velocities of the first and second terminals;
    determining whether or not the calculated distance is equal to or less than a prescribed distance and determining whether or not the acquired movement velocities of the first and second terminals are equal to or less than a prescribed velocity;
    selecting a frequency to be used for the terminal-to-terminal communication based on the calculated distance, when it is determined at the determining that the distance between the terminals is equal to or less than the prescribed distance and that the movement velocities of the first and second terminals are equal to or less than the prescribed velocity; and
    notifying the first and second terminals of a start of the terminal-to-terminal communication and the selected frequency.

2. The wireless communication apparatus according to claim 1, the process further including
    receiving from one of the first and second terminals a communication quality to be used when the first and second terminals perform the terminal-to-terminal communication, and wherein
    the selecting includes selecting the frequency to be used for the terminal-to-terminal communication based on the received communication quality.

3. The wireless communication apparatus according to claim 1,
    wherein
    the selecting includes selecting the frequency to be used for the terminal-to-terminal communication based on interference amount information stored in the memory, the interference amount information indicating an interference amount of each frequency in each communication area.

4. A wireless communication method executed by a computer, the method comprising:
    acquiring location information of a first terminal and a second terminal that perform terminal-to-terminal communication without using a base station;
    calculating a distance between the first and second terminals based on the acquired location information of the first and second terminals;
    acquiring movement velocities of the first and second terminals;
    determining whether or not the calculated distance is equal to or less than a prescribed distance and determining whether or not the acquired movement velocities of the first and second terminals are equal to or less than a prescribed velocity;
    selecting a frequency to be used for the terminal-to-terminal communication based on the calculated distance, when it is determined at the determining that the distance is equal to or less than the prescribed distance and that the movement velocities of the first and second terminals are equal to or less than the prescribed velocity; and
    notifying the first and second terminals of a start of the terminal-to-terminal communication and the selected frequency.

5. A wireless communication system, comprising:
    a first terminal;
    a second terminal; and
    a wireless communication apparatus, wherein
    the wireless communication apparatus includes a memory and a processor coupled to the memory, the processor being configured to execute a process including:
        acquiring location information of the first and second terminals that perform terminal-to-terminal communication without using a base station;
        calculating a distance between the first and second terminals based on the acquired location information of the first and second terminals;
        acquiring movement velocities of the first and second terminals;
        determining whether or not the calculated distance is equal to or less than a prescribed distance and determining whether or not the acquired movement velocities of the first and second terminals are equal to or less than a prescribed velocity;
        selecting a frequency to be used for the terminal-to-terminal communication based on the calculated distance, when it is determined at the determining that the distance is equal to or less than the prescribed distance and that the movement velocities of the first and second terminals are equal to or less than the prescribed velocity; and notifying the first and second terminals of the selected frequency and a start of the terminal-to-terminal communication.

\* \* \* \* \*